US010147337B2

(12) United States Patent
Perrone

(10) Patent No.: US 10,147,337 B2
(45) Date of Patent: Dec. 4, 2018

(54) SIMULATED FORCIBLE ENTRY OF DOORS USING BATTERING RAMS

(71) Applicant: Michael Perrone, Seaford, NY (US)

(72) Inventor: Michael Perrone, Seaford, NY (US)

( * ) Notice: Subject to any disclaimer, the term of this patent is extended or adjusted under 35 U.S.C. 154(b) by 75 days.

(21) Appl. No.: 15/049,169

(22) Filed: Feb. 22, 2016

(65) Prior Publication Data
US 2017/0004734 A1  Jan. 5, 2017

Related U.S. Application Data

(60) Provisional application No. 62/119,229, filed on Feb. 22, 2015, provisional application No. 62/159,301, filed on May 10, 2015.

(51) Int. Cl.
*G09B 19/24* (2006.01)

(52) U.S. Cl.
CPC ................... *G09B 19/24* (2013.01)

(58) Field of Classification Search
USPC .......... 434/219, 226, 247, 258; 49/381, 394, 49/504; 292/219, 240, 241, 261
See application file for complete search history.

(56) References Cited

U.S. PATENT DOCUMENTS

| 2,823,744 | A | * | 2/1958 | Garris | A62B 3/00 160/135 |
| 5,255,727 | A | * | 10/1993 | Saruwatari | E04G 21/30 150/154 |
| 5,485,694 | A | * | 1/1996 | Goad | G09F 7/18 40/606.07 |
| 5,603,194 | A | * | 2/1997 | Fridlyand | E06B 3/7001 109/49.5 |
| D383,381 | S | * | 9/1997 | Philippi | D15/9.1 |
| 6,308,474 | B1 | * | 10/2001 | Wilson | E04G 21/30 150/154 |
| 7,198,835 | B2 | * | 4/2007 | Anderson | A47H 23/04 428/100 |
| D582,052 | S | * | 12/2008 | Borland | D25/48.8 |
| 7,611,356 | B1 | * | 11/2009 | Bishop | G09B 19/00 434/226 |
| 7,854,096 | B2 | * | 12/2010 | Brisbois | E06B 3/30 248/228.1 |
| 8,408,917 | B2 | * | 4/2013 | Perrone | G09B 19/003 434/226 |
| 8,845,333 | B2 | * | 9/2014 | Perrone | G09B 25/00 434/226 |
| 8,926,332 | B2 | * | 1/2015 | Perrone | G09B 19/003 434/226 |
| 9,318,028 | B1 | * | 4/2016 | Ingesson | G09B 9/00 |
| 9,550,082 | B2 | * | 1/2017 | Britton | A62C 99/0081 |
| D805,216 | S | * | 12/2017 | Davis | D25/58 |
| 2005/0050816 | A1 | * | 3/2005 | Manning | E06B 5/11 52/213 |
| 2012/0244512 | A1 | * | 9/2012 | Norris | G09B 9/00 434/387 |
| 2014/0208993 | A1 | * | 7/2014 | Spransy | E05G 5/003 109/50 |

\* cited by examiner

*Primary Examiner* — Kurt Fernstrom

(57) ABSTRACT

Protective battering plate devices are provided, which can be removably attached to a door of a forcible entry training door apparatus. A protective battering plate device is configured to enable simulated forcible entry of an inward swinging locked door by hitting a battering ram against the protective battering plate device mounted on the door of the forcible entry door training apparatus, while protecting the door from damage.

18 Claims, 12 Drawing Sheets

SIMULATED FORCIBLE ENTRY OF DOORS USING BATTERING RAMS

CROSS-REFERENCE TO RELATED APPLICATIONS

This application claims priority to U.S. Provisional Application Ser. No. 62/119,229, filed on Feb. 22, 2015, and U.S. Provisional Application Ser. No. 62/159,301, filed on May 10, 2015, the disclosures of which are incorporated herein by reference.

TECHNICAL FIELD

The present disclosure relates generally to devices and methods for the training of forcible entry of locked doors, and in particular, devices and methods for simulated forcible entry of locked doors using battering ram devices.

BACKGROUND

In emergency situations, police, firefighters, and other first responders may need to forcibly enter a building or dwelling to gain access in order to save lives. One common method of forcible entry involves forcibly opening a locked door. To master the skill of forcible entry of locked doors, one should have a basic knowledge of various types and doors and security devices that can be encountered in emergency situations, as well as actual training in the forcible entry of locked doors using various types of tools that are utilized for such purpose. One forcible entry technique that is commonly performed in emergency situations is forcible entry of locked doors using a battering ram.

For example, FIG. 1 schematically illustrates a conventional battering ram device (10). The battering ram (10) is a handheld device comprising a ramming body (12) and handles (14). The battering ram (10) can be used to forcibly enter inward swinging doors by smashing the ramming body (12) against a portion of the door near the door locking mechanism. By applying repeated blows with sufficient force to the face of the inward swinging door, a person can break the door and/or lock mechanism to forcibly open the inward swinging door.

There are many commercially available forcible entry training door apparatus (or training props) that can be utilized to train for forcible entry of locked doors. However, these training props are not particularly suited for the training of forcible entry of locked doors using battering rams. Indeed, the door(s) of such forcible entry training door apparatus can be damaged by repeated blows from a battering ram.

SUMMARY OF THE INVENTION

Embodiments of the invention include protective battering plate devices that are removably attached to a door of a forcible entry training apparatus to enable the forcible entry training apparatus to be used for simulated forcible entry of locked doors using a battering ram, while protecting the door of the forcible entry training apparatus from damage.

For example, a protective battering plate device according to one embodiment of the invention includes a steel striking plate, and a u-shaped portion disposed on one end of the steel striking plate. The u-shaped upper portion of the protective battering plate device is configured to slip over the top edge of a door of a forcible entry training door apparatus and allow the protective battering plate device to hang on the door. The protective battering plate device is configured to be impacted by a battering ram device to forcibly open the door of the forcible entry training door apparatus while protecting the door from damage.

A protective battering plate device according to another embodiment of the invention includes a steel striking plate, a beveled edge portion and one side edge of the steel striking plate a force limiting plate that extends orthogonal to a surface of the steel striking plate, and mounting holes that are configured to be in alignment to mounting holes on a door of the forcible entry training door apparatus on which the protective battering plate device can be mounted. The protective battering plate device is configured to be impacted by a battering ram device to forcibly open the door of the forcible entry training door apparatus while protecting the door from damage.

Another embodiment of the invention includes a forcible entry door training apparatus. The forcible entry door training apparatus includes a base plate and a door frame mounted to the base plate, wherein the door frame comprises a first side jamb, a second side jamb and a header jamb coupled between upper ends of the first and second side jambs. The forcible entry door training apparatus includes a door having a first side edge and a second side edge, and at least one hinge attaching the first side edge of the door to the first side jamb of the door frame for hingedly mounting the door within the door frame. A protective battering plate device is removably mounted to the door. The protective battering plate device is configured to enable simulated forcible entry of an inward swinging locked door by hitting a battering ram against the protective battering plate device mounted on the door of the forcible entry door training apparatus, while protecting the door from damage.

Other embodiments will be described in the following detailed description of embodiments, which is to be read in conjunction with the accompanying figures.

DETAILED DESCRIPTION OF EMBODIMENTS

Embodiments of the invention will now be described in further detail with regard to protective battering plate devices that can be removably attached to a door of a forcible entry training apparatus to enable the training apparatus to be used for simulated forcible entry of locked doors using a battering ram, while protecting the door of the training apparatus from accompanying drawings are schematic illustrations that are not drawn to scale. It is to be further understood that same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, diameters, etc., are meant to denote being close or approximate to, but not exactly. For example, the term "about" or "substantially" as used herein implies that a small margin of error is present, such as 10% or less than the stated amount.

Figure 2:
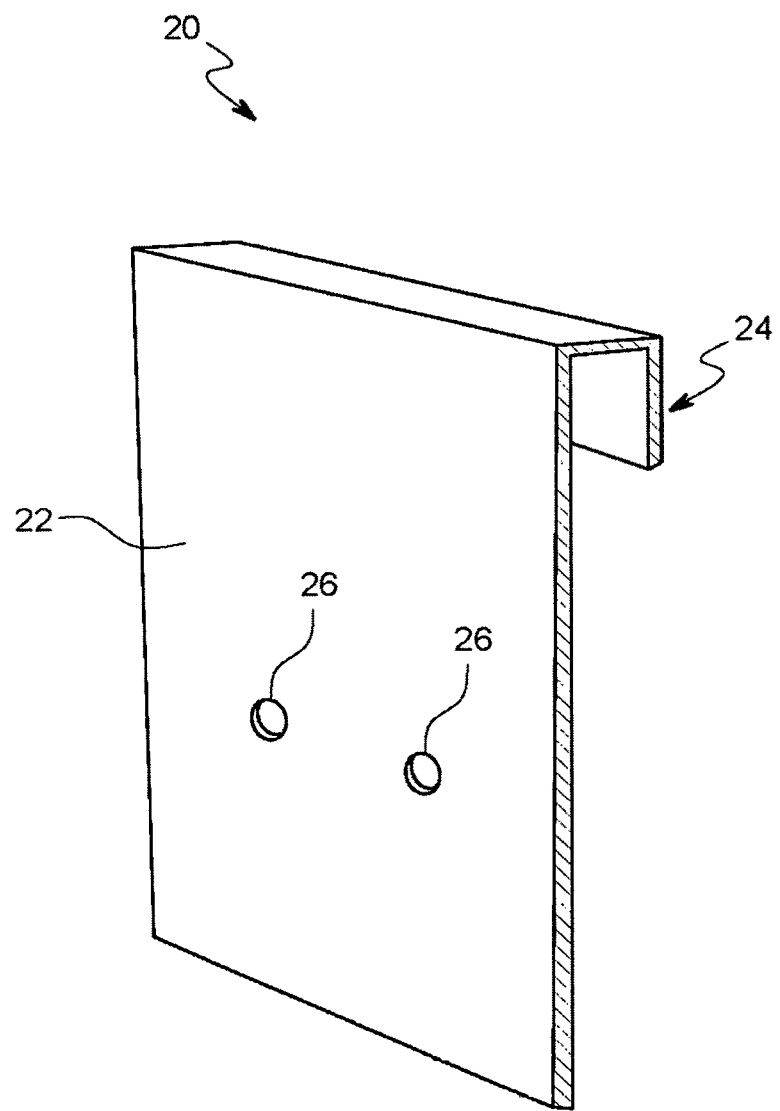
FIG. 2 schematically illustrates a front perspective view of a protective battering plate device according to an embodiment of the invention.
Figure 3:
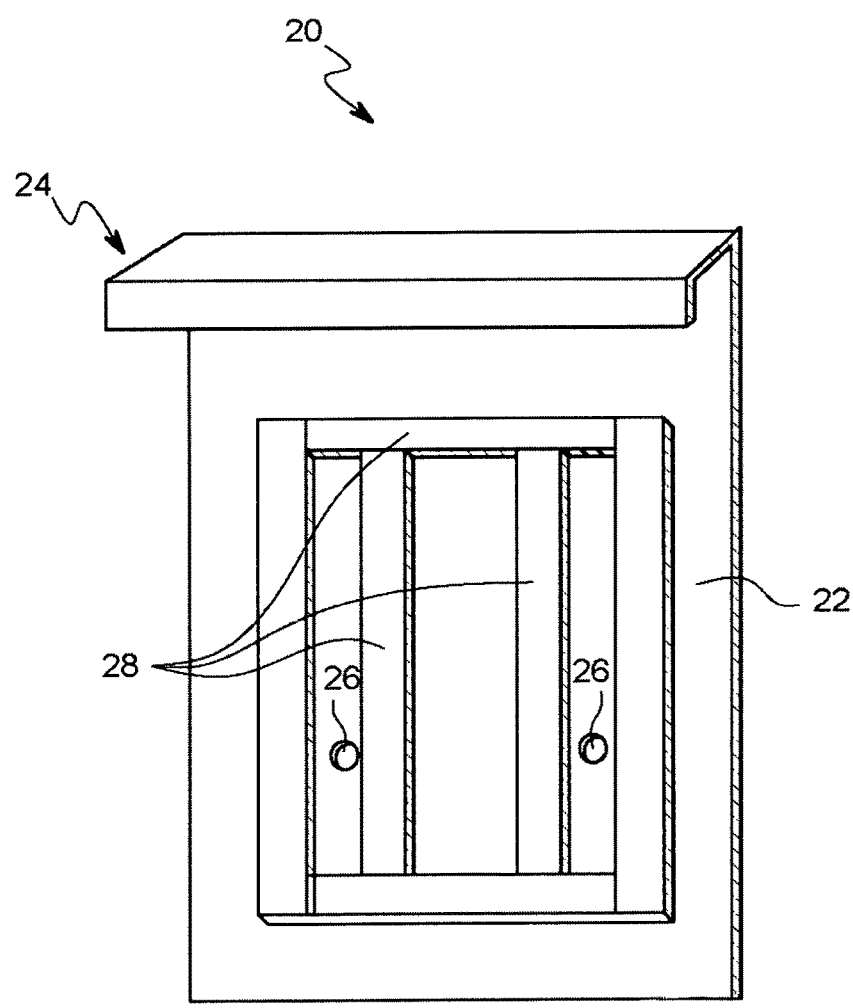
FIG. 3 schematically illustrates a back perspective view of the protective battering plate device of FIG. 2, according to an embodiment of the invention.

FIGS. 2 and 3 schematically illustrate front and back perspective views of a protective battering plate device (20) according to an embodiment of the invention. The protective battering plate device (20) comprises a steel striking plate (22), a u-shaped upper portion (24), mounting holes (26), and a plurality of steel strips (28) disposed on a back surface of the steel striking plate (22). In one embodiment of the invention, the various components of the protective battering plate device (20) can be fabricated using pieces of planar steel with a thickness in a range of ¼ inch to ½ inch, for example, which are welded together.

Figure 1:
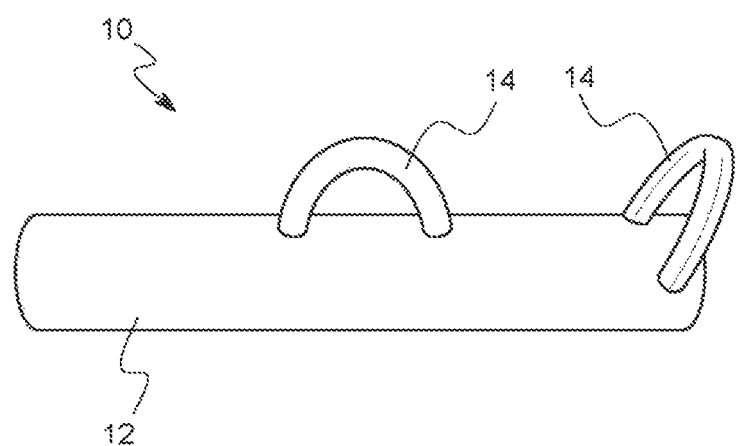
FIG. 1 schematically illustrates a conventional battering ram device.
Figure 4:
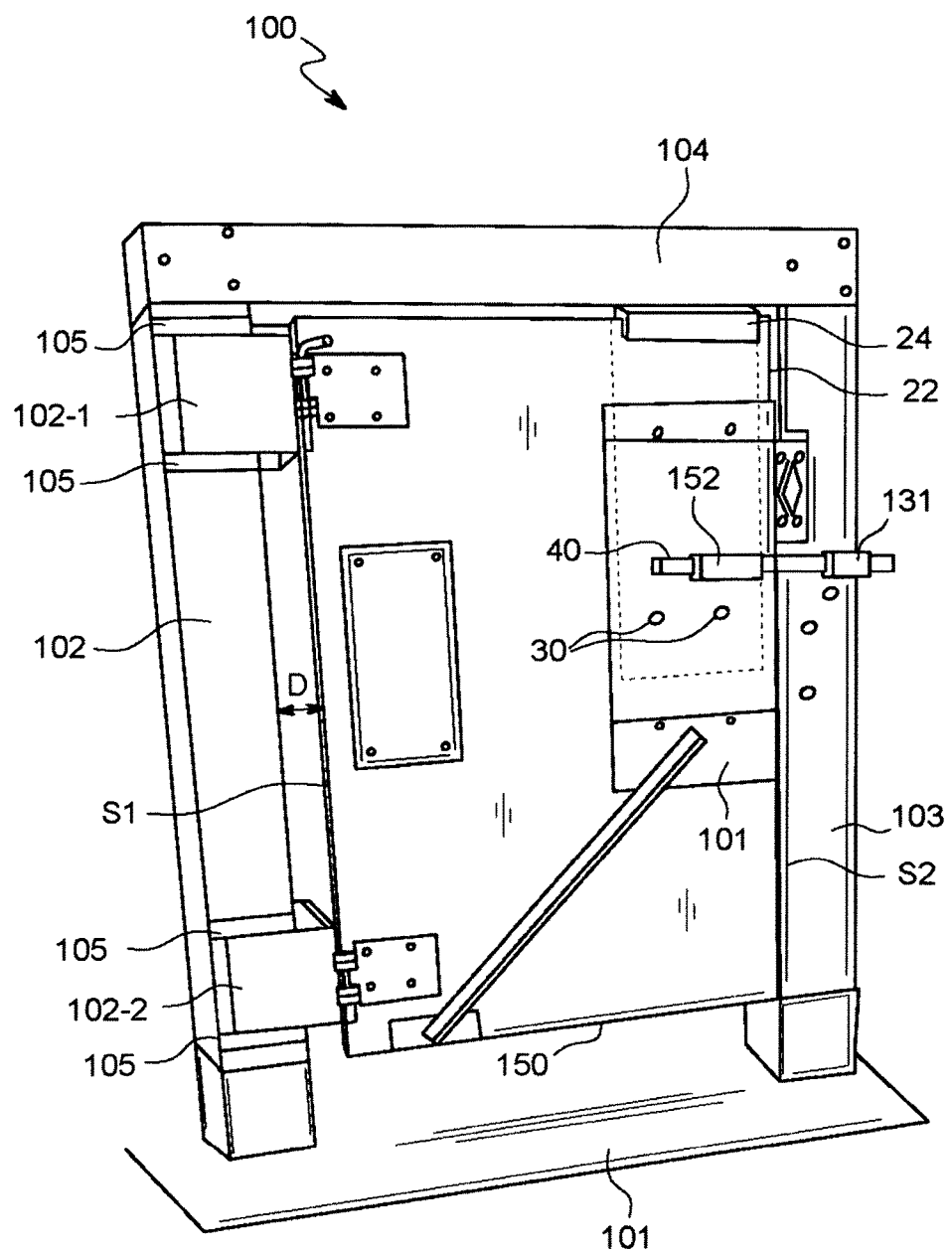
FIG. 4 schematically illustrates a method for using the protective battering plate device of FIGS. 2 and 3 with a forcible entry training door apparatus, according to an embodiment of the invention.

As explained in further detail below with reference to FIG. 4, the u-shaped upper portion (24) is configured to slip over the top edge of a door of a forcible entry training door apparatus (as shown in FIG. 4) and allow the protective battering plate device 20 to hang on the door. In this manner, a person can forcibly ram the protective battering plate device (20) using a battering ram device (such as shown in FIG. 1), as opposed to directly hitting the door of the forcible entry training door apparatus, to thereby simulate the forcible entry of a locked door using the forcible entry training door apparatus. During simulated forcible entry training, the impact of the battering ram device against the front of the protective battering plate device (20) (FIG. 2) allows the protective battering plate device (20) to disperse the force of impact over a larger area of the door so as to prevent damage to the door of the forcible entry training door apparatus.

It is to be understood that the protective battering plate device (20) can be used in conjunction with various commercially available forcible entry training door apparatus such as the apparatus disclosed in U.S. Pat. No. 8,408,917, which is commonly owned and incorporated herein by reference. In particular, FIG. 4 illustrates the use of the protective battering plate device (20) on an inward swinging door (150) of a forcible entry training door apparatus (100) as disclosed in U.S. Pat. No. 8,408,917. As shown in FIG. 4, the forcible entry door training apparatus (100) comprises a base plate (101), a door frame mounted to the base plate (101), wherein the door frame comprises a first side jamb (102), a second side jamb (103), and a header jamb (104) coupled between upper ends of the first and second side jambs (102) and (103). The door (150) includes a first side edge S1 and a second side edge S2. A first hinge device (102-1) and a second hinge device (102-2) are attached the first side edge S1 of the door (150) and to the first side jamb (102) of the door frame, to hingedly mount the door (150) within the door frame.

As explained in further detail in U.S. Pat. No. 8,408,917, the hinge devices (102-1) and (102-2) include springs that bias the hinge devices (102-1) and (102-2) away from the inner surface of the first side jamb (102) to maintain a gap distance D between the side edge S1 of the door (150) and the inner surface of the vertical jamb (102). The springs are configured to resist compression with sufficient force to simulate forces that are encountered when attempting to wedge a pry tool (e.g., Halligan tool) between the second edge S2 of the door (150) and the second side jamb (103) during simulated forcible entry operations. The hinge devices (102-1) and (102-2) comprises a U-shaped brackets comprising a front plate that is disposed adjacent to the inner surface of the first side jamb 102), and side plates that are disposed on each side of the first side jamb (102). The side plates of the U-shaped brackets are slidably disposed between guide rails (105) that are formed on the surfaces of the first side jamb (102). When a tool is wedged between the second edge S2 of the door (150) and the second side jamb (103), the bias springs of the hinge devices (102-1) and (102-2) are compressed, causing the U-shaped brackets of the hinge devices (102-1) and (102-2) to slide along the guide rails (105) towards the first side jamb (102), thereby decreasing the gap distance D between the side edge S1 of the door (150) and the inner surface of the first side jamb (102).

As shown in FIG. 4, the protective battering plate device (20) is hung on a top portion of the door (150) by slipping the u-shaped top portion (24) of the device (20) over the top of the door (150), allowing the device (20) to hang down from the top of the door (150) with the striking plate (22) disposed adjacent to a portion of the front side of the door (150). FIG. 4 shows the outline of the steel striking plate (22) in phantom (as dashed lines) on the front side of the door, while FIG. 4 is a perspective view of the back side of the door (150). The device (20) can be temporarily secured to the door 150) using mounting bolts (30) that are inserted through the mounting holes (26) of the steel striking plate (22), and corresponding holes which are formed in the door (150) in alignment with the mounting holes (26).

As shown in FIG. 3, the steel strips (28) arranged on the backside surface of the steel striking plate (22) serve various purposes. When the device (20) is mounted to the door (150), the steel strips (28) make contact with the surface of the door (150). The steel strips (28) serve to distribute ramming forces to the surface of the door (150) as a battering ram is slammed against the front side of the steel striking plate (22). Moreover, the steel strips (28) serve as an offset to provide voids/spaces between the back surface of the steel striking plate (22) and the surface of the door (150) to provide room for any bolt heads or other protruding structures that may exist on the surface of the door (150).

As shown in FIG. 4, to simulate forcible entry of a locked door, a strip of wood (40) (e.g., 1 inch×2 inch furring strip) is inserted through a pair of brackets (152) and (131) which are disposed in alignment on the back side of the door (150) and a side jamb (103) of the forcible entry training door apparatus. The strip of wood (40) is configured to simulate a locking mechanism of the door (150) (e.g., dead bolt lock) and maintain the door (150) in a fixed position during simulation training. A battering ram device (such as shown in FIG. 1) can be used to repeatedly strike the front side of the steel plate (22) (disposed against the front side of the door (150) opposite the back side of door (150) shown in FIG. 4), which results in applying a force to the strip of wood (40). Through multiple repeated blows to the protective battering plate device (20), the strip of wood (40) will incrementally crack until it finally breaks completely, thereby simulating the forces that are encountered when forcibly breaking through a locked inward swinging door. Although the example embodiment of FIG. 4 shows the use of a strip of wood (40) to simulate the breaking forces needed to mechanically break open a locked inward swinging door with a battering ram, the protective battering plate device (20) can be used with other types of forcible entry training door apparatus which utilize other mechanisms (e.g., spring mechanisms, etc.) to simulate locked inward swinging doors.

Figure 5:
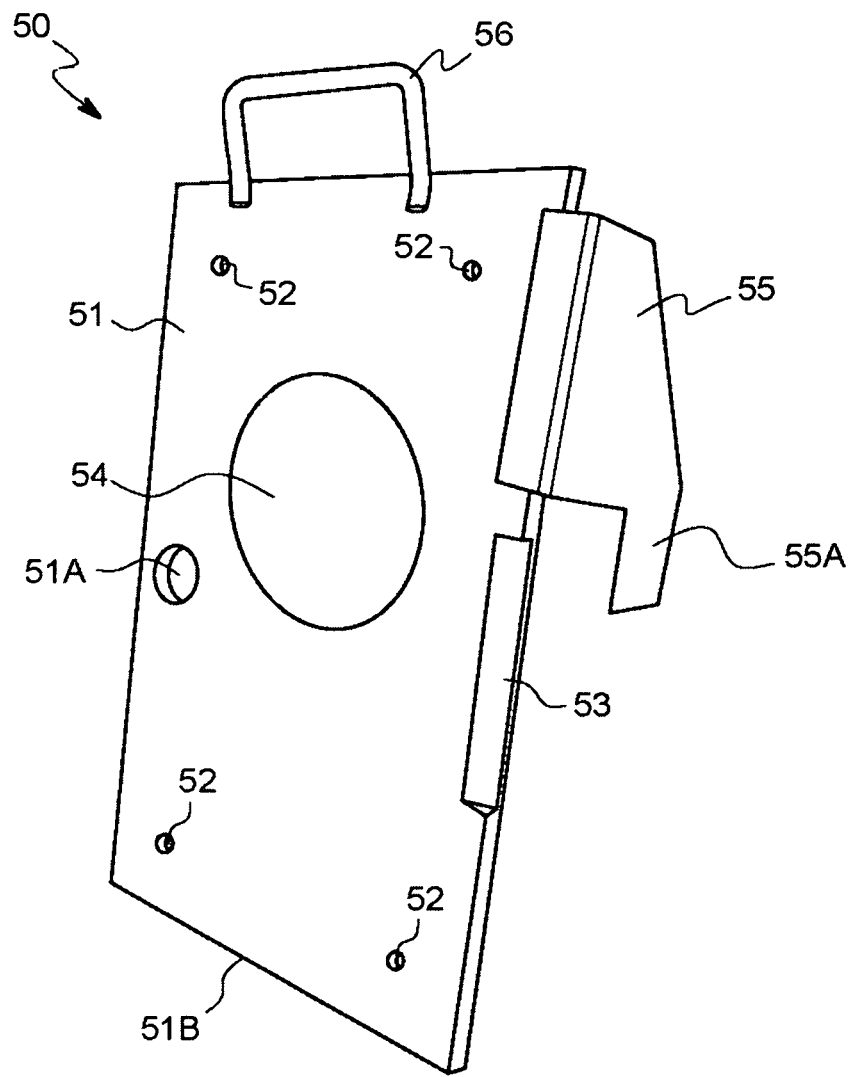
FIG. 5 schematically illustrates a perspective view of a protective battering plate device according to another embodiment of the invention.

FIG. 5 schematically illustrates a front perspective view of a protective battering plate device (50) according to another embodiment of the invention, which can be removably attached to a door of a forcible entry training door apparatus to enable the forcible entry training door apparatus to be used for simulated forcible entry of a locked door using a battering ram, while protecting the door from damage. As shown in FIG. 5, the protective battering plate device (50) comprises a steel striking plate (51), a plurality of mounting holes (52), a beveled edge portion (53), a visual striking target (54), an optional force limiting plate (55), and a handle (56). The protective battering plate device (50) further comprises one or more holes 51A which are formed to accommodate certain features (e.g., bolt heads, etc.) that protrude from the surface of a training prop door, and allow the protective battering plate device (50) to lay flat against the surface of the training prop door.

Figure 6:
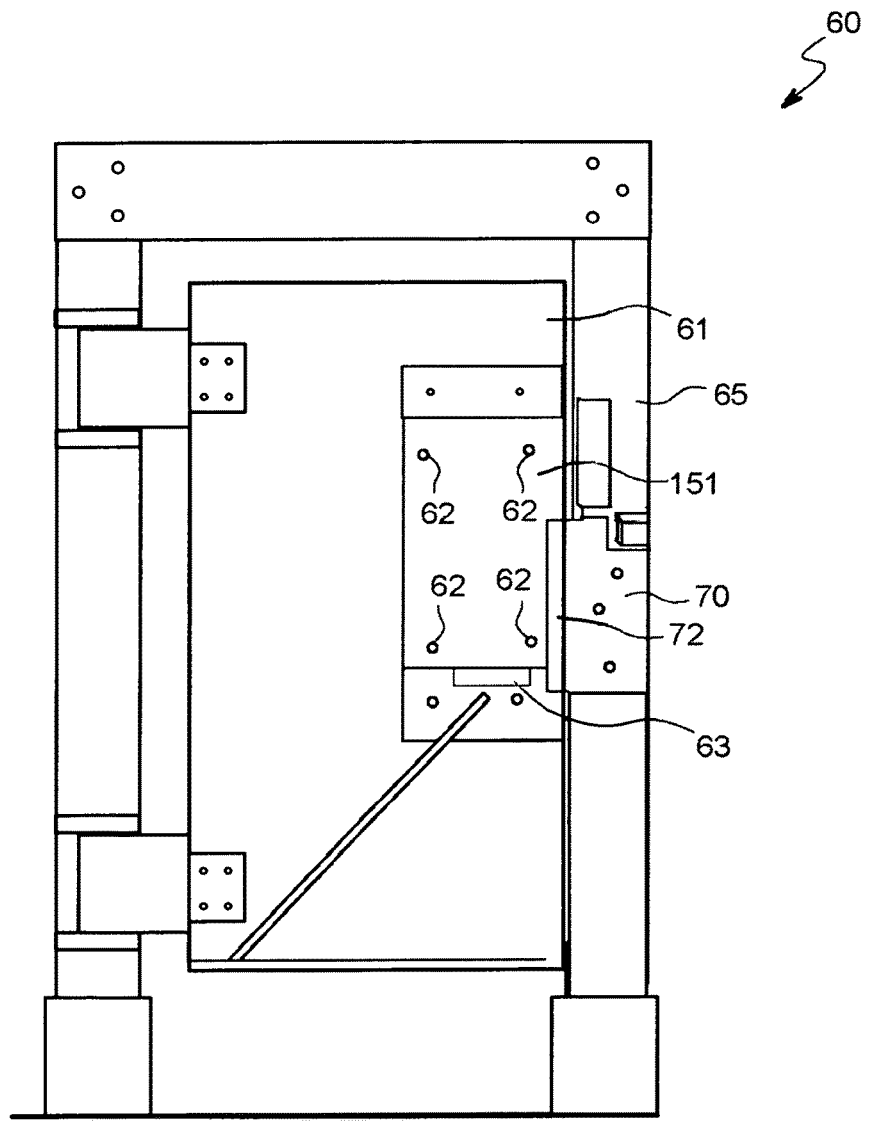
FIG. 6 illustrates an example embodiment of a forcible entry training door apparatus, which can be used in conjunction with the device of FIG. 5.

In one embodiment of the invention, as illustrated in FIGS. 6, 7, 8, 9, and 11, and as discussed in further detail below, the protective battering plate device (50) can be used in conjunction with a forcible entry training door apparatus such as disclosed in the above-incorporated U.S. Pat. No. 8,408,917. For example, FIG. 6 illustrates an example embodiment of a forcible entry training door apparatus (60), which has a framework that is based on a forcible entry training door apparatus as disclosed in U.S. Pat. No. 8,408,917, and similar to the forcible entry training door apparatus (100) as discussed above with reference to FIG. 4.

In particular, FIG. 6 illustrates a portion of the forcible entry training door apparatus (60) which is used to simulate forcible entry of a right hand inward opening door (61). FIG. 6 illustrates a front side of the right hand inward opening door (61). The door (61) comprises a plurality of mounting holes (62) that are aligned with corresponding mounting holes (52) of the protective battering plate device (50) of FIG. 5. As in the exemplary forcible entry training door apparatus discussed above with reference to FIG. 4, the door (61) may include a thin steel plate (151) that wraps around the front, side and back portion of the door (61) to provide added strength and protection and structural integrity to the door (61) (in embodiments where the door (161) is a hollow steel door). Moreover, in one embodiment of the invention, when the door (61) is a hollow steel door, cylindrical steel collets can be utilized which pass through the door (61) between corresponding mounting holes (62) on the front and back sides of the door (61), wherein the ends of the cylindrical steel collets are welded to the front and back panels of the door (61) and/or plate (151), In this regard, the cylindrical steel collets would provide added structural integrity to prevent the front surface of the door (61) (or other portions of the door (61)) from being crushed, bent, or otherwise damaged by battering forces that are applied to the protective battering plate device (50) mounted to the door (61) during simulated training.

The door (61) further comprises a cleat (63) which is used as a support when mounting the protective battering plate device (50) to the door (61). In particular, to mount the protective battering plate device (50) to the door (61), an individual could grab and lift the protective battering plate device (50) using the handle (56), rest a bottom edge (51B) of the steel striking plate (51) on top of the cleat (63), and then push the battering plate device (50) against the surface of the door (61) (e.g., against the steel plate (151)). The individual can then slidably adjust the battering plate device (50) to the left or right, as needed, to align the mounting holes (52) of the device (50) to the corresponding mounting holes (62) of the door (61), and then insert bolts of suitable length and width through the aligned mounting holes (52)/(62), and screw a wing nut or regular nut on the end portion of the bolt sticking out of the backside of the door (61) to securely bolt the protective battering plate device (50) in place on the door (61).

Figure 7:
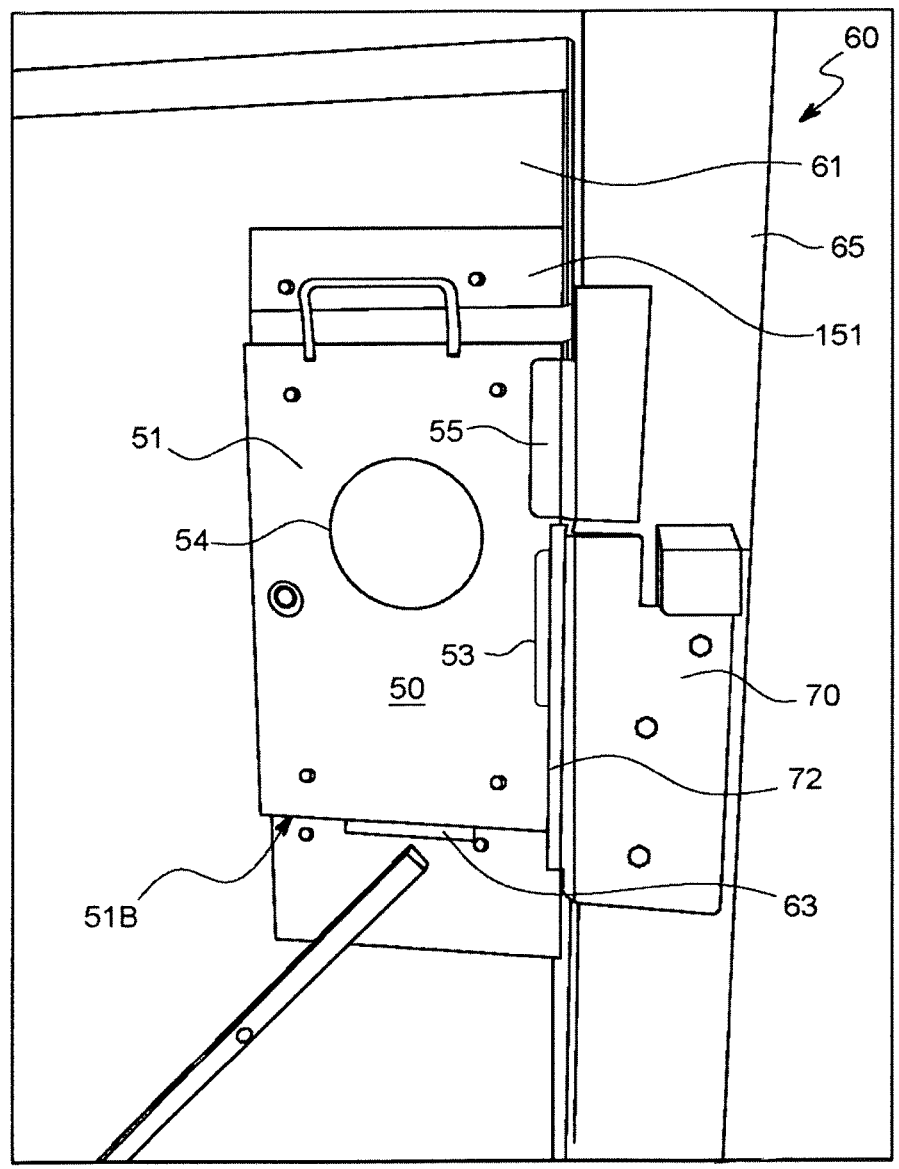
FIG. 7 illustrates the protective battering plate device of FIG. 5 mounted on a door of the forcible entry training door apparatus of FIG. 6, according to an embodiment of the invention.

FIG. 7 illustrates the protective battering plate device (50) of FIG. 5 mounted on the front side of the door (61) of the forcible entry training door apparatus (60). As shown in FIGS. 6 and 7, the forcible entry training door apparatus (60) comprises a removable jamb plate (70) including a door stop (72), which is mounted to a vertical jamb (65) of the forcible entry training door apparatus (60). The protective battering plate device (50) is sized and shaped such that the surface of the door (61) can make contact to the inner edge of the door stop (72) when the door (61) is closed, even with the protective battering plate device (50) mounted to the door (61). Moreover, as explained below with reference to FIG. 11, the beveled edge (53) of the protective battering plate device (50) enables an individual to use the forcible entry training door (60) to simulate forcible entry on a right hand inward opening door using a Halligan tool even with the protective battering plate device (50) is mounted on the door (61).

Figure 8:
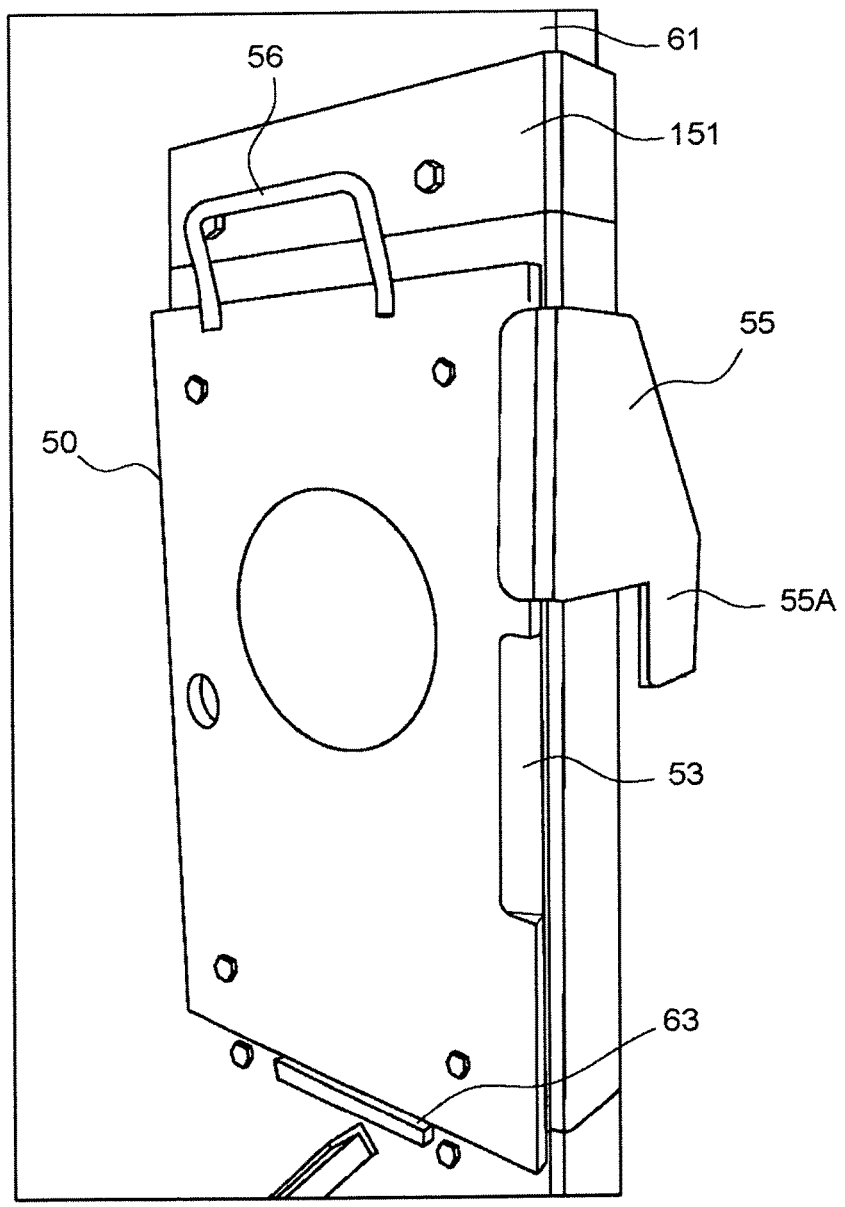
FIG. 8 is a perspective view showing the protective battering plate device of FIG. 5 mounted on the door of the forcible entry training door apparatus of FIG. 6, according to an embodiment of the invention.
Figure 9:
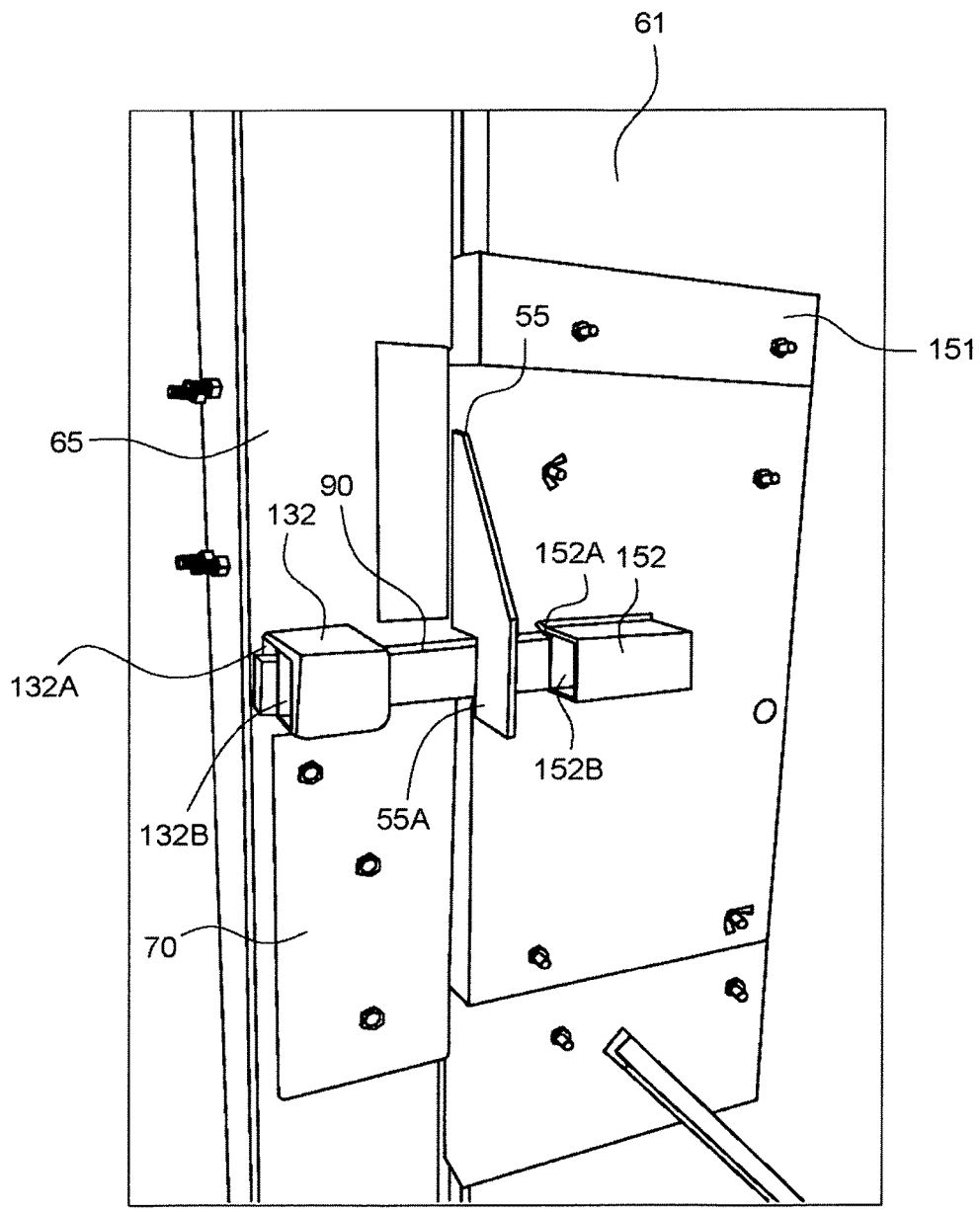
FIG. 9 is a perspective view showing a mode of operation of a force limiting plate of the protective battering plate device of FIG. 5 when mounted to the door of the forcible entry training door apparatus of FIG. 6, according to an embodiment of the invention.

FIG. 8 is a perspective view showing the protective battering plate device (50) mounted on the front side of the door (61), wherein the force limiting plate (55) is shown to wrap around the side edge of the door (61) and protrude past the back side of the door (61). FIG. 9 is a perspective view showing the back side of the door (61) with the protective battering plate device (50) mounted on the front side of the door (61), wherein the force limiting plate (55) is shown to protrude from between the vertical jamb (65) and the side edge of the door (61) and extend past the back side of the door (61). The force limiting plate (55) is an optional feature that may be included to limit the size of a resistance bar (90), such as a wood strip (as shown in FIG. 9), which is used to maintain the door (61) in a simulated "locked" position (e.g., simulate a locked inward swinging door). Similar to the simulated locking mechanism as discussed above with reference to FIG. 4, the resistance bar (90) shown in FIG. 9 is configured to simulate the physical resistance of a locked door when using battering ram to hit the battering plate device (50) mounted on the front side of the door (61) and simulate the forcible entry of a locked inward swinging door by cracking/breaking the resistance bar (90).

FIG. 9 is a perspective view showing a mode of operation of the force limiting plate (55) of the protective battering plate device (50) when mounted to the door (61) of the forcible entry training door apparatus (60), according to an embodiment of the invention. As shown in FIG. 9, the forcible entry training door apparatus (60) comprises retaining brackets (132) and (152) fixedly disposed (e.g., welded) on outside surfaces of the vertical door jamb (65) and protective steel plate (151), respectively. As further depicted in FIG. 9, for example, the retaining bracket (132) comprises different sized first and second channels (132A) and (132B), and the retaining bracket (152) comprises different-sized first and second channels (152A) and (152B). When the door (61) is shut, the first channels (132A) and (152A) are aligned, and the second channels (132B) and (152B) are aligned.

In one embodiment, the first channels (132A) and (152A) can be sized and shaped to insertably receive a smaller-sized resistance bar (e.g., a length of a 1"×2" wood furring strip, which is actually ¾"×1.5") and the second channels (132B) and (152B) can be sized and shaped to insertably receive a larger-sized resistance bar (e.g., a length of a wood stud that is 1.5"×1³⁄₁₆" (i.e., a 2"×3" wood stud ripped in half)). The different sized resistance bars serve to simulate a locking device to keep the door (61) from opening, and to simulate different magnitude resistive forces that are encountered when trying to force open a locked door by breaking a lock or driving the lock (e.g., deadbolt) off the door using a Halligan bar, for example, using the techniques as disclosed in the above-incorporated U.S. Pat. No. 8,408,917.

As shown in FIG. 9, the resistance bar (90) (e.g., a length of a 1"×2" wood furring strip) is inserted through the first channels (132A) and (152A) of the retaining brackets (132) and (152). However, when the protective battering plate device (50) is mounted to the door (61) and the door (61) is placed in a closed position, the blocking portion (55A) of the force limiting plate (55) is disposed between the second channels (132B) and (152B) of the retaining brackets (132) and (152). In this regard, the blocking portion (55A) of the force limiting plate (55) serves to block a thicker resistance bar from being inserted through the second channels (132B) and (152B). This prevents the thicker resistance bar from being used for simulated forcible entry using a battering ram, which can result in damage to one or more components of the forcible entry door training prop (60). Indeed, it has been determined from experimentation that the use of the smaller resistance bar (which fits through the first channels (132A) and (152A) of the retaining brackets (132) and (152)) is sufficient to simulate the forces that are encountered with a lock door when training in the techniques of forcible entry using a battering ram device with the forcible entry door training apparatus (60) shown in the accompanying figures.

Figure 10A:
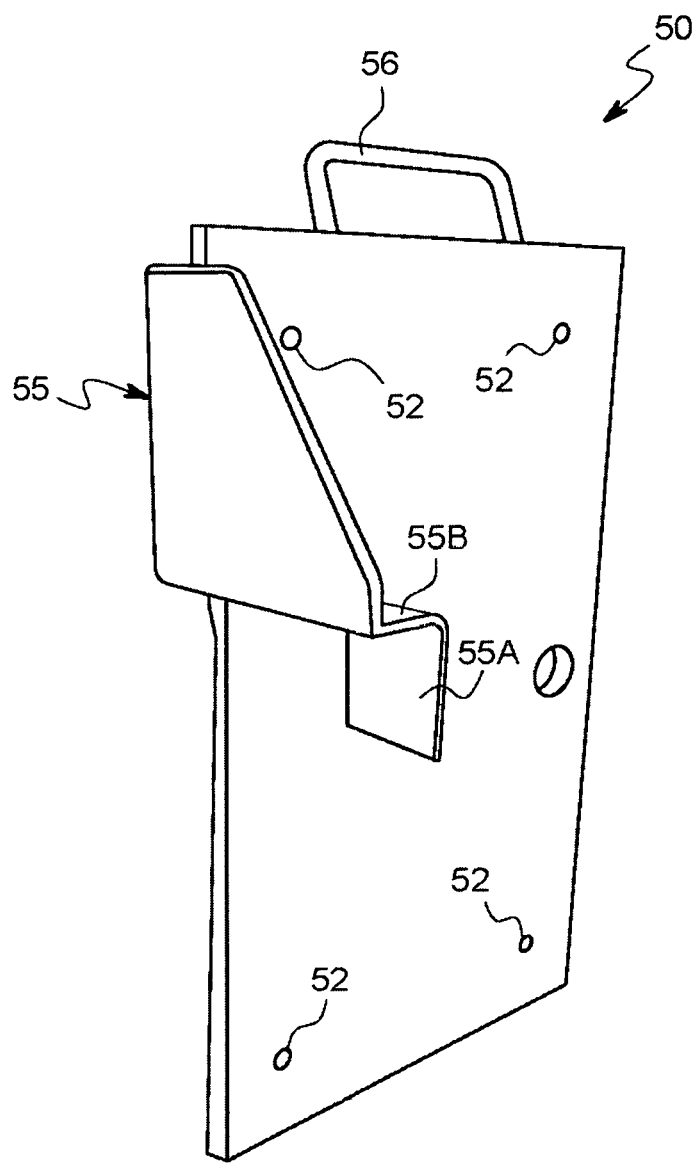
FIGS. 10A and 10B are schematic views of a protective battering plate device according to another embodiment of the invention.
Figure 10B:
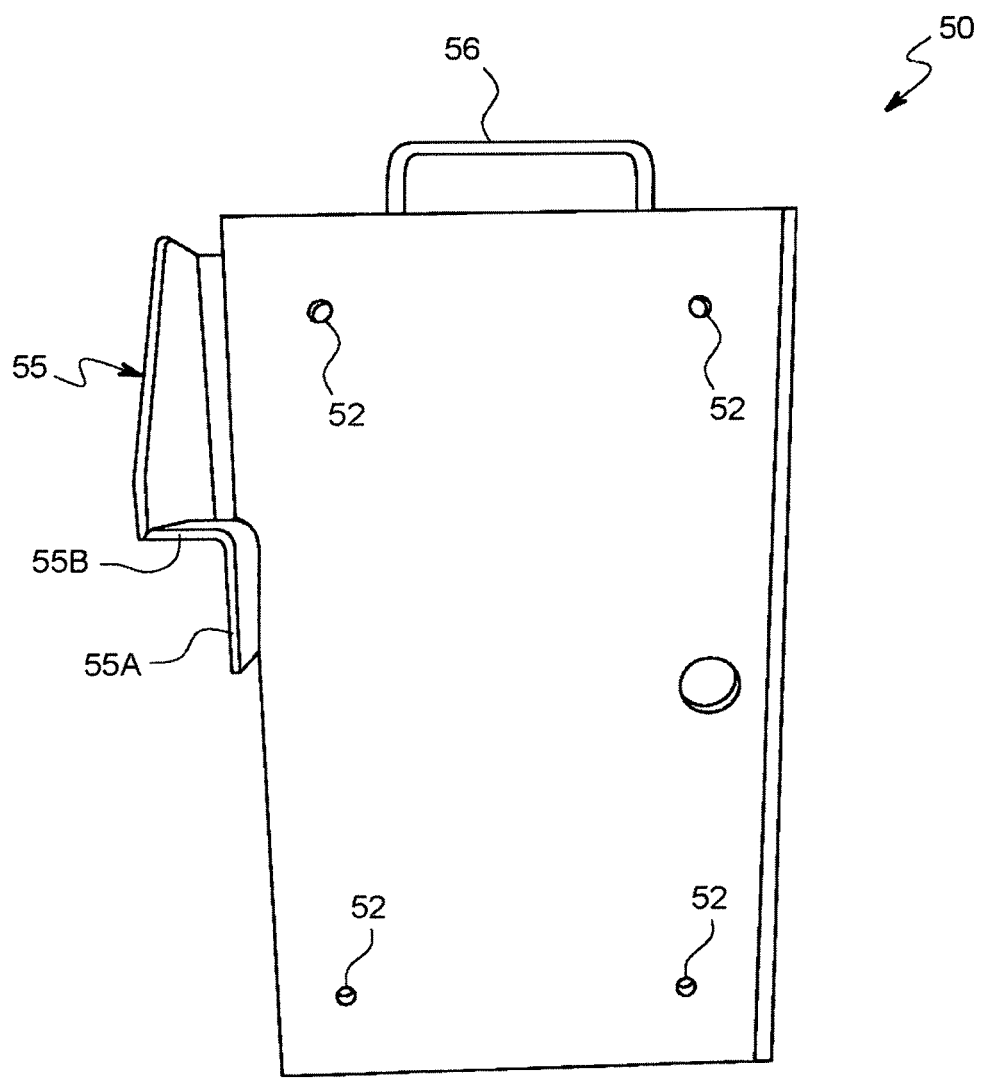

In other embodiments of the invention, the force limiting plate (55) can be sized and shaped in other ways to block the use of certain channels of the retaining brackets (132) and (152) and thereby limit the size of the wood resistance bars that can be used in conjunction with the battering ram plate device (50). For instance, FIGS. 10A and 10B schematically illustrate a perspective view of a protective battering plate device according to another embodiment of the invention. In particular, FIGS. 10A and 10B illustrate a modified embodiment of the protective battering plate device (50) in which the blocking plate (55A) is disposed at an offset position using an extended portion (55B) to position the blocking plate (55A) adjacent to the opening to the channel (152B) of the retaining bracket (152). As compared to the embodiment shown in FIG. 9, the offset positioning of the blocking plate (55A) would allow for more room to accommodate the bending and cracking of the wood resistance bar (90) along the length of the resistance bar (90) between the retaining brackets (132) and (152) during simulated forcible entry, while still serving to block the opening to the channel (152B) of the retaining bracket (152) and prevent the use of thicker resistance bars.

As noted above, the beveled edge (53) of the protective battering plate device (50) enables an individual to use the forcible entry training door (60) to simulate forcible entry on a right hand inward opening door using a Halligan tool even with the protective battering plate device (50) mounted on the door (61). For example, FIG. 11 is a perspective view showing a method of using the forcible entry training door (60) to simulate forcible entry on a right hand inward opening door (61) using a Halligan tool (200) with the protective battering plate device (50) mounted on the door (61).

Figure 11:
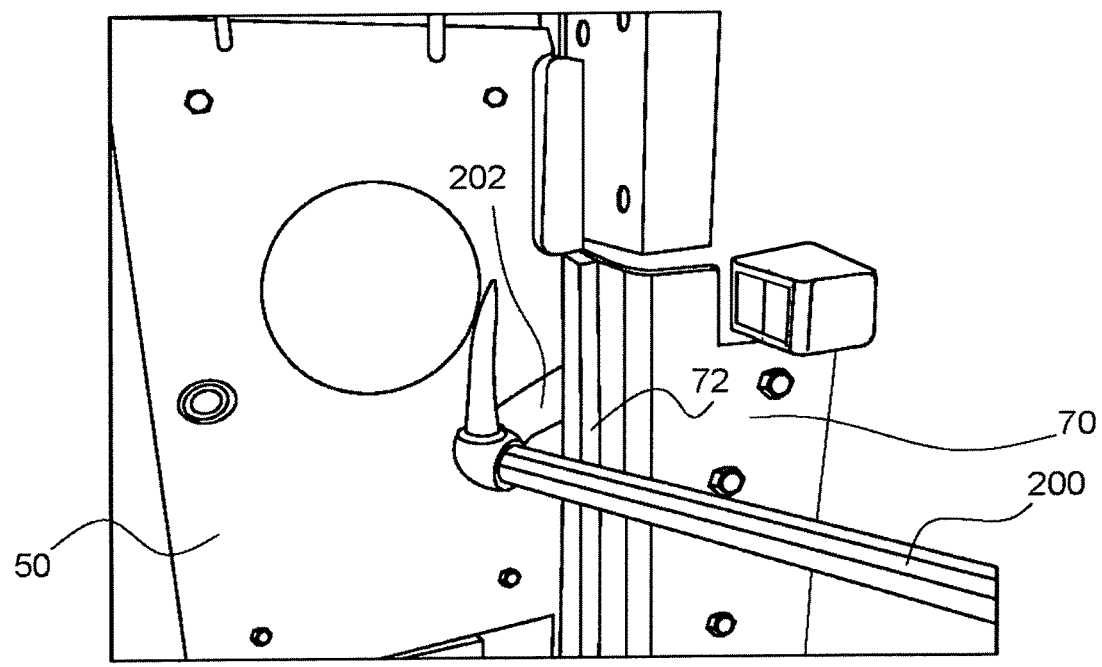
FIG. 11 is a perspective view showing a method of using a forcible entry training door apparatus to simulate forcible entry on a right hand inward opening door using a Halligan tool with the protective battering plate device of FIG. 5 mounted on the door of the forcible entry training door apparatus of FIG. 6, according to an exemplary embodiment of the invention.

As shown in FIG. 11, an initial step in a method of forcing the inward operating door (61) with a Halligan tool (200) may begin with using an ADZ end (202) of the Halligan tool (200) to "gap" the door and create a "purchase" between the stop (72) and the door (61). With this process, an individual would forcibly insert the ADZ end (202) of the Halligan tool (200) between the edge of the door (61) and the door stop (72) and the individual would push down on the Halligan tool (200) causing the ADZ end (202) to rotate and thereby forcibly create a "gap" between the edge of the door (61) and the stop (72). This "gapping" causes the door (61) to forcibly push against (and slightly bend or slightly crack) the resistance bar (90) on the back side of the door (61). In practice, the use of the Halligan tool (200) for "gapping" a locked door would actually bend and crush the door edge or stop to create a purchase (or gap). With a forcible entry simulation using the Halligan tool (200), the beveled edge (53) of the protective battering plate device (50) provides sufficient room to allow the ADZ end (202) (or a forked end) of the Halligan tool (200) to be inserted between the edge of the door (61) and the door stop (72) when the battering plate device (50) is mounted to the door (61). During simulated forcible entry using a battering ram device, the Halligan tool can be initially used as discussed above to slightly crack the resistance bar (90) on the back side of the door (61), followed by ramming the battering ram device against the protective battering plate device (50) to further crack/break the wood resistance bar and force open the inward swinging door (61). In this regard, the Halligan can be initially used to weaken the resistance bar so that less battering force can be applied to the door using the battering ram device to completely crack the resistance bar and, thereby, forcibly open the inward swinging door.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention,

I claim:

1. A protective battering plate device configured for use in conjunction with a forcible entry training door apparatus, the device comprising:

a steel striking plate comprising at least one mounting hole; and a u-shaped portion disposed on one end of the steel striking plate;

wherein the u-shaped upper portion of the protective battering plate device is configured to slip over the top edge of a door of a forcible entry training door apparatus and allow the protective battering plate device to hang on the door, and wherein the at least one mounting hole is configured to align to at least one through-hole formed through the door to allow the steel striking plate to be bolted to the door of the forcible entry training door apparatus; and wherein the protective battering plate device is configured to be impacted by a battering ram device to forcibly open the door of the forcible entry training door apparatus while protecting the door from damage.

2. The protective battering plate device of claim 1, further comprising a plurality of steel strips disposed on a back surface of the steel striking plate, wherein the steel strips are configured to distribute a battering force, which is applied to a front surface of the steel striking plate, over a surface area of the door.

3. A protective battering plate device configured for use in conjunction with a forcible entry training door apparatus, the device comprising:

a steel striking plate;

a beveled edge portion on one side edge of the steel striking plate;

a force limiting plate that extends orthogonal to a surface of the steel striking plate; and mounting holes that are configured to be in alignment to mounting holes on a door of the forcible entry training door apparatus on which the protective battering plate device can be mounted;

wherein the protective battering plate device is configured to be impacted by a battering ram device to forcibly open the door of the forcible entry training door apparatus while protecting the door from damage.

4. The protective battering plate device of claim 3, further comprising a handle connected to an upper edge of the steel striking plate.

5. A forcible entry training door apparatus, comprising:

a base plate;

a door frame mounted to the base plate, the door frame comprising a first side jamb, a second side jamb and a header jamb coupled between upper ends of the first and second side jambs; and a door having a first side edge and a second side edge;

at least one hinge attaching the first side edge of the door to the first side jamb of the door frame for hingedly mounting the door within the door frame; and a protective battering plate device removably mounted to the door, wherein the protective battering plate device is configured to enable simulated forcible entry of an inward swinging locked door by hitting a battering ram against the protective battering plate device mounted on the door of the forcible entry training door apparatus, while protecting the door from damage;

wherein the protective battering plate device comprises a steel striking plate comprising at least one mounting hole, wherein the at least one mounting hole is aligned to at least one through-hole formed through the door, wherein the steel striking plate is bolted to the door of the forcible entry training door apparatus using a bolt that is inserted through the at least one mounting hole of the steel plate and the at least one through-hole of the door.

6. The forcible entry training door apparatus of claim 5, wherein the protective battering plate device comprises:

a u-shaped portion disposed on one end of the steel striking plate;

wherein the u-shaped upper portion is configured to slip over the top edge of the door and allow the protective battering plate device to hang on the door.

7. The forcible entry training door apparatus of claim 6, further comprising a plurality of steel strips disposed on a back surface of the steel striking plate, wherein the steel strips are configured to distribute a battering force, which is applied to a front surface of the steel striking plate, over a surface area of the door.

8. The forcible entry training door apparatus of claim 5, wherein the protective battering plate device comprises:

a beveled edge portion on one side edge of the steel striking plate; and a force limiting plate that extends orthogonal to a surface of the steel striking plate.

9. The forcible entry training door apparatus of claim 8, wherein the protective battering plate device further comprises a handle connected to an upper edge of the steel striking plate.

10. The forcible entry training door apparatus of claim 8, further comprising a first retaining bracket disposed on the door and a second retaining bracket disposed on the second side jamb, aligned to the first retaining bracket;

wherein the first retaining bracket comprises different sized first and second channels, wherein the second retaining bracket comprises different-sized first and second channels that are aligned to the first and second channels, respectively, of the first retaining bracket when the door is in a closed position, wherein the force limiting plate is configured to prevent use of at least one of the aligned channels of the first and second retaining brackets when the door is in the closed position.

11. The forcible entry training door apparatus of claim 10, further comprising an elongated resistance member extending through the first and second retaining brackets, wherein the elongated resistance member is a length of wood.

12. The forcible entry training d apparatus of claim 5, wherein the at least one hinge is mounted to the first side jamb for slidable motion towards and away from an inner surface of the first side jamb and wherein the at least one hinge includes springs that bias the at least one hinge away from the inner surface of the first side jamb and which resist compression with sufficient force to simulate forces that are encountered when attempting to wedge a pry tool between the door and the second side jamb.

13. The forcible entry training door apparatus of claim 12, wherein the at least one hinge comprises a U-shaped bracket comprising a front plate that is disposed adjacent the inner surface of the first side jamb, and side plates that are disposed on each side of the first side jamb.

14. The forcible entry training door apparatus of claim 13, wherein the side plates of the U-shaped bracket are slidably disposed between guide rails on the side surfaces of the first side jamb.

15. The forcible entry training door apparatus of claim 5, further comprising a removable jamb plate including a door stop attached to the second side jamb.

16. The forcible entry training door apparatus of claim 5, further comprising a first retaining bracket disposed on the door and a second retaining bracket disposed on the second side jamb, aligned to the first retaining bracket, wherein the first and second retaining brackets insertably receive an elongated resistance member to simulate resistive forces of a locking device to keep the door from opening when battering the door with the battering ram.

17. The forcible entry training door apparatus of claim 16, further comprising an elongated resistance member extending through the first and second retaining brackets.

18. The forcible entry training door apparatus of claim 17, wherein the elongated resistance member is a length of wood.

\* \* \* \* \*